(12) United States Patent
Caswell

(10) Patent No.: US 9,033,648 B2
(45) Date of Patent: May 19, 2015

(54) COOLED GAS TURBINE ENGINE MEMBER

(75) Inventor: Mark Owen Caswell, Avon, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 526 days.

(21) Appl. No.: 13/335,113

(22) Filed: Dec. 22, 2011

(65) Prior Publication Data
US 2012/0183386 A1 Jul. 19, 2012

Related U.S. Application Data

(60) Provisional application No. 61/427,134, filed on Dec. 24, 2010.

(51) Int. Cl.
F01D 25/12 (2006.01)
F02C 7/143 (2006.01)
F01D 5/08 (2006.01)

(52) U.S. Cl.
CPC . F02C 7/143 (2013.01); F01D 5/08 (2013.01); F01D 25/12 (2013.01); F05D 2260/211 (2013.01); F05D 2260/213 (2013.01); Y02T 50/676 (2013.01)

(58) Field of Classification Search
USPC .............. 415/116, 117, 178, 179, 175, 176; 416/95
See application file for complete search history.

(56) References Cited

U.S. PATENT DOCUMENTS

| | | | |
|---|---|---|---|
| 2,868,500 A * | 1/1959 | Boulet | 416/96 R |
| 3,275,294 A * | 9/1966 | Allen et al. | 415/115 |
| 3,845,619 A | 11/1974 | O'Neill | |
| 4,793,772 A | 12/1988 | Zaehring et al. | |
| 4,896,499 A | 1/1990 | Rice | |
| 5,127,794 A | 7/1992 | Burge et al. | |
| 5,271,711 A | 12/1993 | McGreehan et al. | |
| 5,297,386 A | 3/1994 | Kervistin | |
| 5,394,687 A | 3/1995 | Swann | |
| 5,722,241 A | 3/1998 | Huber | |
| 5,842,831 A | 12/1998 | Galke et al. | |
| 5,888,049 A | 3/1999 | Broadhead et al. | |
| 6,098,395 A | 8/2000 | North | |
| 6,267,553 B1 | 7/2001 | Burge | |
| 6,276,896 B1 | 8/2001 | Burge et al. | |

(Continued)

FOREIGN PATENT DOCUMENTS

EP 1956214 A2 * 8/2008

OTHER PUBLICATIONS

International Search Report and Written Opinion, Apr. 27, 2012, PCT/US2011/067115.

(Continued)

Primary Examiner — Dwayne J White
Assistant Examiner — Justin Seabe
(74) Attorney, Agent, or Firm — Krieg DeVault LLP

(57) ABSTRACT

A gas turbine engine is disclosed having a vane disposed in a flow path of a gas turbine engine component, for example a gas turbine engine compressor. The vane is in thermal contact with a heat tube that extends through a wall of the engine component and into a space in which a thermal fluid passes. The thermal fluid can be at a different temperature than the vane such that heat is transferred between the two. In one embodiment the vane forms part of an intercooler for a compressor of the gas turbine engine. The vane can have a fin disposed at the end of the heat tube to facilitate a heat transfer.

23 Claims, 5 Drawing Sheets

(56) References Cited

U.S. PATENT DOCUMENTS

| | | |
|---|---|---|
| 6,378,287 B2 | 4/2002 | Griffiths |
| 6,430,931 B1 | 8/2002 | Horner |
| 6,557,345 B1 | 5/2003 | Moeckel |
| 6,637,208 B2 | 10/2003 | Horner |
| 6,764,279 B2 | 7/2004 | Meshenky |
| 6,929,056 B2 | 8/2005 | Meshenky et al. |
| 6,948,909 B2 | 9/2005 | Meshenky et al. |
| 7,011,147 B1 * | 3/2006 | Hung .................... 165/104.33 |
| 7,600,382 B2 * | 10/2009 | Ralls, Jr. ..................... 60/730 |
| 2007/0240424 A1 | 10/2007 | Matheny et al. |
| 2008/0050218 A1 * | 2/2008 | Sokhey ........................ 415/119 |
| 2008/0054644 A1 | 3/2008 | Lueck |
| 2008/0141678 A1 | 6/2008 | Brunet et al. |
| 2008/0240924 A1 * | 10/2008 | Kizuka et al. ............. 416/223 R |
| 2009/0282804 A1 | 11/2009 | Smalley et al. |
| 2011/0014028 A1 * | 1/2011 | Wood et al. ...................... 415/1 |

OTHER PUBLICATIONS

US 6,182,450, 02/2001, Horner (withdrawn)
US 6,253,553, 07/2001, Horner (withdrawn)

\* cited by examiner

COOLED GAS TURBINE ENGINE MEMBER

RELATED APPLICATIONS

The present application claims the benefit of U.S. Provisional Patent Application No. 61/427,134 filed Dec. 24, 2010 which is incorporated herein by reference.

GOVERNMENT RIGHTS

The present inventions were made with U.S. Government support under contract number F33615-03-D-2357 awarded by the United States Air Force. The United States Government may have certain rights in the present inventions.

TECHNICAL FIELD

The present invention generally relates to gas turbine engine flow path devices structured to exchange heat, and more particularly, but not exclusively, to intercoolers for gas turbine engine compressors.

BACKGROUND

Influencing a heat flux in a member disposed in a flow path of a gas turbine engine remains an area of interest. Some existing systems have various shortcomings relative to certain applications. Accordingly, there remains a need for further contributions in this area of technology.

SUMMARY

One embodiment of the present invention is a unique gas turbine engine heat exchange device. Other embodiments include apparatuses, systems, devices, hardware, methods, and combinations for intercooling a compressor flow of a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
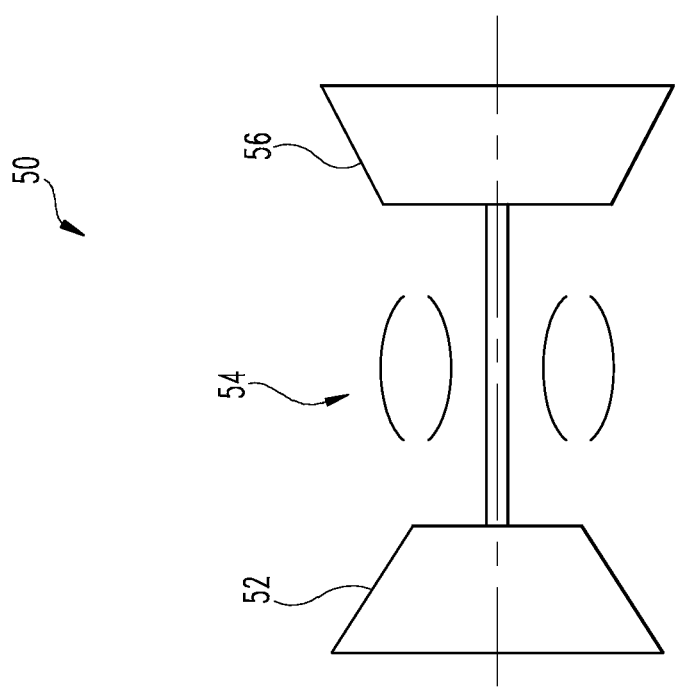
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having a compressor 52, combustor 54, and turbine 56 which together are used to produce a useful power. Though the gas turbine engine 50 is disclosed as a single spool turbojet engine, other embodiments of the gas turbine engine 50 can include a variety of other variations. For example, the gas turbine engine 50 can be a multi spool engine and/or can take the form of a turbofan, turboshaft, or turboprop engine. The gas turbine engine 50 can be an axial flow, centrifugal flow, or mixed flow engine. To set forth just a few more non-limiting variations, in some forms the gas turbine engine 50 can be an adaptive or variable cycle engine.

The compressor 52 includes a row of rotating blades capable of increasing a pressure of a working fluid flowing through the gas turbine engine. The compressor 52 also includes a row of vanes positioned either upstream or downstream of the row of rotating blades to assist in directing an airflow or modulating a flow area of the working fluid flowing through the compressor 52. The vanes can be stationary or can be moveable. The vanes can be immediately upstream or immediately downstream and can be considered together with the blades to form a compressor stage. In some embodiments the compressor 52 can include multiple rows of rotating blades and vanes such that a multi stage compressor 52 is formed.

The turbine 56 also includes a row of rotating blades capable of extracting work from a working fluid flowing through the gas turbine engine. The turbine can include a row of vanes positioned either upstream or downstream of a row of rotating blades to assist in directing an airflow or modulating a flow area of the working fluid flowing through the turbine 56. The vanes can be immediately upstream or immediately downstream and can be considered together with the blades to form a turbine state. In some embodiments the turbine 56 can include multiple rows of rotating blades and vanes to create a multi stage turbine 56.

In one form the gas turbine engine 50 is used in conjunction with an aircraft to provide power in the form of propulsive power and/or mechanical or electrical power to the aircraft or systems aboard the aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
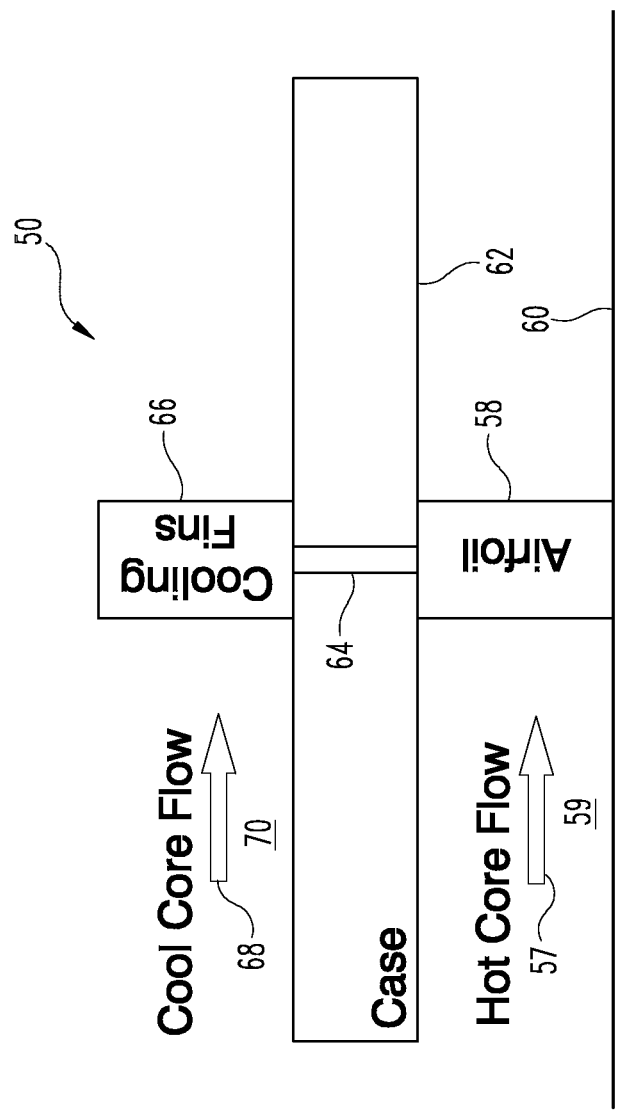
FIG. 2 depicts one embodiment of the present application.

Turning now to FIG. 2, one embodiment of the gas turbine engine 50 is shown in which a vane 58 is disposed in a flow path 59 of a component capable of altering a pressure of a working fluid 57 flowing through the component. In one form the component is the compressor 52 of the gas turbine engine 50. Though the embodiment depicted in FIG. 2 does not explicitly depict the rotating blades of the component, such as the rotating blades of the compressor 52, it will be understood that such blades can be located either or both upstream and downstream of the depicted vane 58. It will also be appreciated that the component can include a plurality of vanes 58 disposed circumferentially about the gas turbine engine 50. The vane 58 extends between an inner wall 60 and an outer wall 62 of the flow path 59 and in some forms can extend past either or both the inner wall 60 and outer wall 62. In some forms the vane 58 can be positioned to provide a gap between either or both of its ends and the inner wall 60 and outer wall 62. In some embodiments the outer wall 62 may be a case of the gas turbine engine, such as a compressor case. The vane 58 is in thermal communication with a heat tube 64 in the present application, and in the illustrative embodiment also with a thermal fin 66. Heat can be transferred between the vane 58 and the heat tube 64 via conduction. Heat can also be transferred to or from the heat tube 64 via convection and/or radiation.

The heat tube 64 is used to transfer heat between the vane 58 and a thermal fluid flow path 70 on a side of the outer wall 62 opposite the vane 58. In one form the heat tube 64 is used to transfer heat between the vane 58 and a thermal fluid 68 passing through the thermal fluid flow path 70. In one embodiment the flow rate, pressure, and/or temperature of the thermal fluid 68 can be modulated for purposes of transferring heat with the vane 58. The thermal fluid 68 can be at a temperature that is relatively cooler than the working fluid 57 passing through the component, but need not always be cooler. However, for ease of discussion below the thermal fluid will be referred to as a cooling fluid 68 to better illustrate an embodiment of the present application. The cooling fluid 68 can originate from a variety of locations. In some embodiments the cooling fluid 68 is routed to the vane 58 from an area upstream in the gas turbine engine 50. In other embodiments the cooling fluid 68 can be routed to the vane 58 from another stream, among a variety of other possible locations. To set forth just a few non-limiting examples, the cooling fluid 68 can be from a bypass of a turbofan engine. The cooling fluid 68 can also be from an upstream area of the compressor 52 of the gas turbine engine 50. In still other forms the cooling fluid 68 can be produced by forward motion of an aircraft, such as might be provided via a ram air duct among other possibilities. In one embodiment the cooling fluid 68 can be flowed independent of operation of the gas turbine engine 50.

After the cooling fluid 68 has passed the heat tube it can be routed to a variety of locations. In some forms the cooling fluid 68 can be merged with another stream of the gas turbine engine 50, or can be used elsewhere in or around the gas turbine engine 50. The cooling fluid 68 can be used elsewhere in the aircraft or can be dumped overboard. Other possibilities are also contemplated.

In one non-limiting form the cooling fluid 68 is isolated from the working fluid 57 traversing the flow path 59. To set forth just one non-limiting example, the cooling fluid 68 can be permitted to exchange heat with the vane 58 via the heat tube 64, but the cooling fluid 68 may not be routed through the outer wall 62. In another non-limiting example, the cooling fluid 68 may not be allowed to infiltrate into the vane 58 and be vented to the flow path 59.

The heat tube 64 can have a variety of shapes and sizes useful in transferring heat between the vane 58 and the cooling fluid 68. Furthermore, the heat tube 64 can also be of solid cross section in some forms and can have an interior that is either filled or hollow in others. The heat tube 64 can be unitary in some forms and can be an assembly of parts in another. The attributes of the heat tube 64, such as but not limited to the shape and size, can vary along the heat tube 64 as it extends radially outward from the vane 58. As will be appreciated, the term "tube" is not intended to limit the structure to any particular shape or size in general, and is not intended to limit it to a cylindrical hollow device in particular.

The heat tube 64 can be attached, fitted, and/or coupled to the vane 58 in some forms and can be unitary with it in others. In some forms the heat tube 64 can extend into the vane 58 a variety of distances.

The heat tube 64 can extend out from the outer wall 62 a variety of distances. In some forms the radially outer most portion of the heat tube 64 may form part of the outer wall 62 and/or part of the surface that defines a flow path for the cooling fluid 68. To set forth just one non-limiting example, the heat tube 64 can form part of the flow surface and therefore not extend into the flow path for the cooling fluid 68.

In the illustrative embodiment the heat tube 64 is in thermal communication with the thermal fin 66. Although only one thermal fin 66 is depicted in communication with the heat tube 64, in some embodiments more than one thermal fin 66 can be used. The thermal fin 66 provides a surface area over which heat can be transferred between it and the passing cooling fluid 68. Not all embodiments of the heat tube 64 need be in communication with a thermal fin 66. The thermal fin 66 can be a unitary member, or can be an assembly of parts, that is attached, fitted, or otherwise coupled to the heat tube 64. In some embodiments the thermal fin 66 can be integral with the heat tube 64. In one non-limiting embodiment the heat tube 64 can be a hollow tube and the thermal fin is formed by crimping an end of the heat tube 64. The thermal fin 66 can take a variety of shapes such as flat, a shape that is curved, or a shape having a thickness that varies along the length of the thermal fin 66, among other possible shapes. The thermal fin 66 can be solid in some embodiments and in others can have an interior that is either hollow or is filled. Not all thermal fins 66 need have the same characteristics such as shape, size, etc. The thermal fin 66 can have a variety of sizes and can be made out of a variety of materials.

A heat conductive metal such as copper can be used in either or both the heat tube 64 and thermal fin 66. Other types of materials and constructions, whether metallic, non-metallic, polymer, or otherwise, can be used in the forming of the heat tube 64 and/or thermal fin 66.

Figure 3:
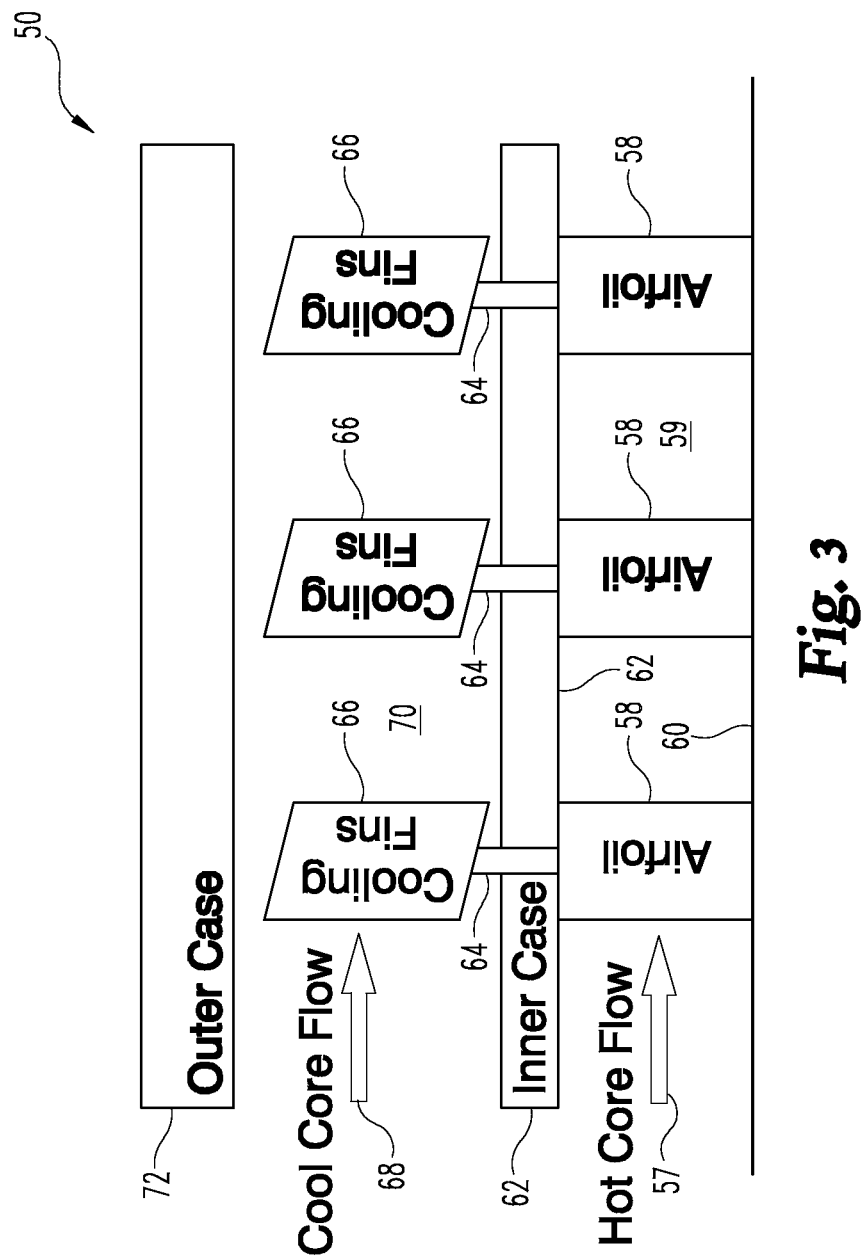
FIG. 3 depicts one embodiment of the present application.

Turning now to FIG. 3, one embodiment of the gas turbine engine 50 illustrates a plurality of vanes 58 in thermal communication with a plurality of thermal fins 66 via heat tubes 64. The thermal fins 66 are disposed in a thermal fluid flow path 70 between the outer wall 62 and a structure 72. In one form the component illustrated in FIG. 3 is a compressor 52 of the gas turbine engine 50. In one embodiment the outer wall 62 can be an inner case of the gas turbine engine component and the structure 72 can be an outer case of the component. The flow rate of the thermal fluid 68 through the thermal fluid flow path 70 can be controlled by a valve, door, or other structure. In some forms the thermal fluid 68 can be used to change the temperature of the wall 62 to vary a tip clearance between the wall and a rotating blade of the component.

Figure 4:
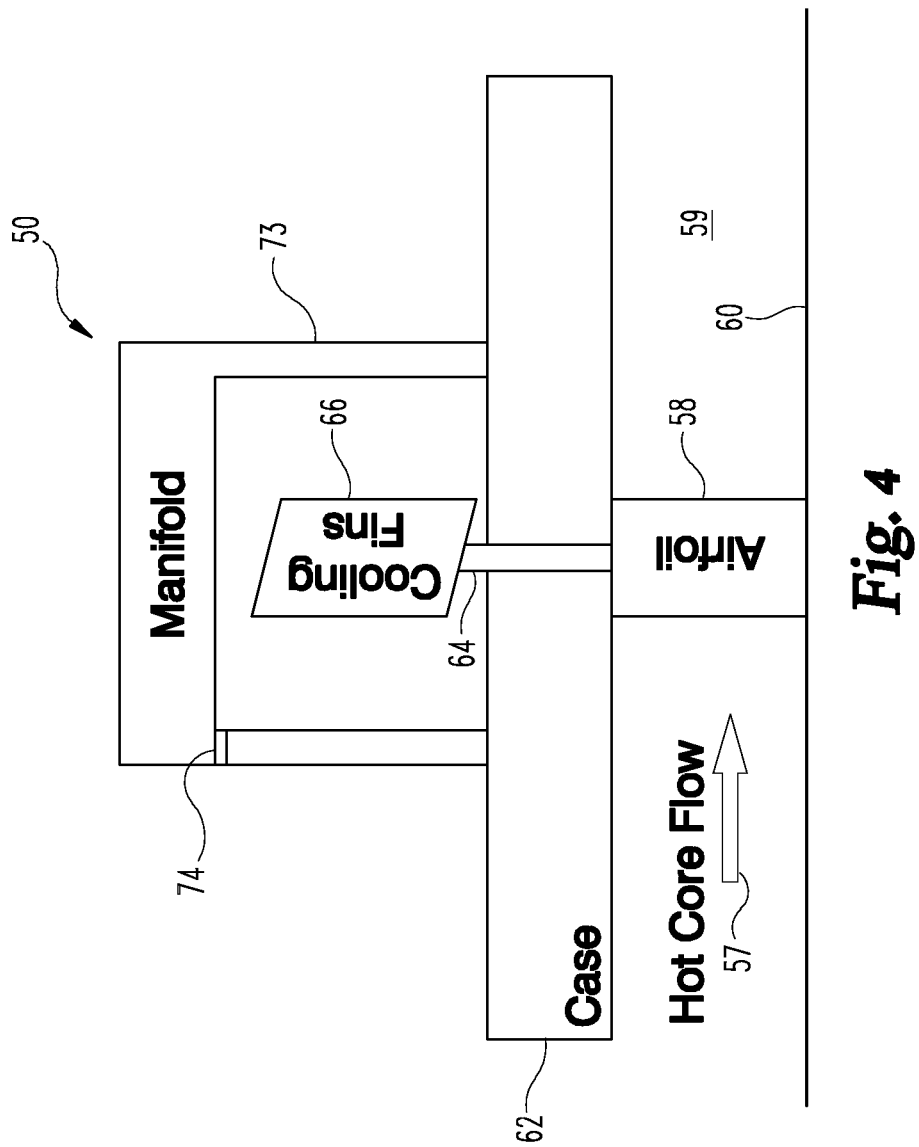
FIG. 4 depicts one embodiment of the present application.

FIG. 4 depicts yet another embodiment of the gas turbine engine 50 in which a manifold 73 is disposed around the thermal fin 66. The manifold 73 is capable of extending circumferentially around the gas turbine engine 50. In some forms, however, multiple manifolds 73 can be used to extend circumferentially around the gas turbine engine 50. In other forms the manifold 73 may only partially extend around the gas turbine engine 50. The manifold 73 can include an opening 74 through which the thermal fluid 68 passes and an outlet (not shown). The manifold 73 can include any numbers of openings 74 arranged at a variety of locations. The manifold 73 can be coupled with a valve, door, or other type of structure to control the amount of fluid flowing through the manifold 73. In some forms the valve, door, or other structure can be coupled with the opening to control the amount of fluid entering the manifold 73. In some embodiments of the gas turbine engine 50, multiple manifolds 73 can be used at multiple different axial stations to enclose multiple numbers of heat tubes 64. In some forms a manifold 73 can extend to cover heat tubes 64 at a variety of axial stations.

In the illustrative embodiments discussed above, though the heat tube 64 and thermal fin 66 are shown disposed outside of outer wall 62, in some forms the heat tube 64 and/or thermal fin 66 can be disposed in a flow path located inside of the inner wall 60.

Figure 5:
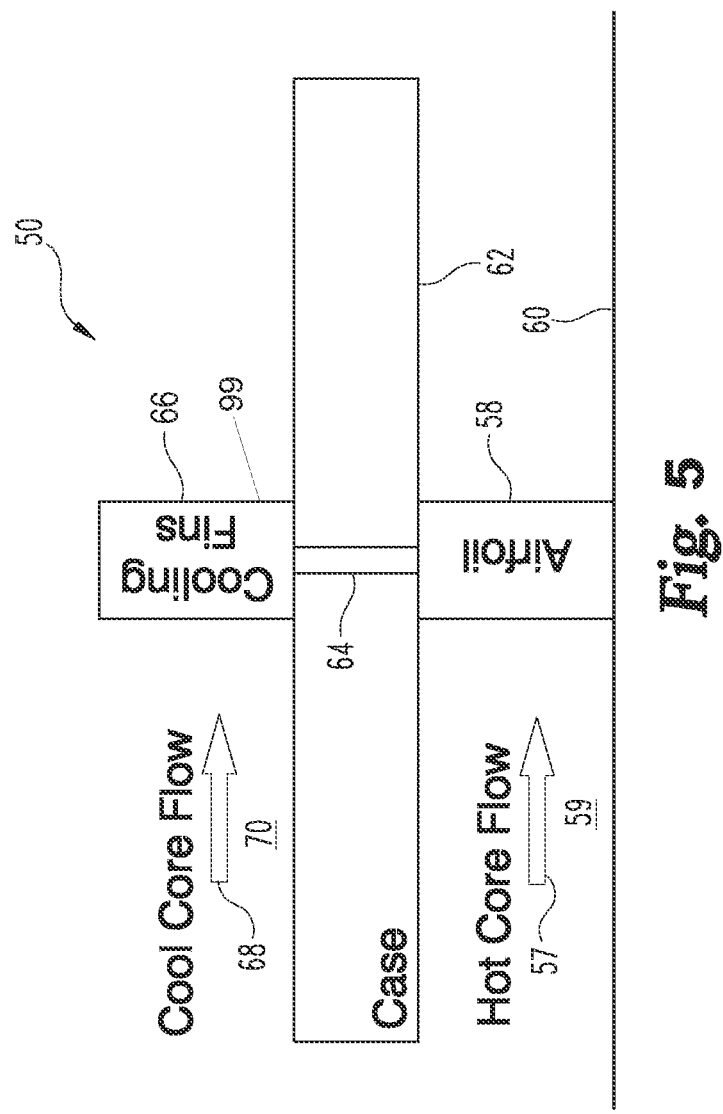
FIG. 5 depicts one embodiment of the present application wherein a fin 66 is formed by a crimped portion 99 of heat tube 64.

FIG. 5 depicts an embodiment of the present application wherein a fin 66 is formed by a crimped portion 99 of heat tube 64.

In one mode of operation, the component of the gas turbine engine 50 is a compressor and the vane 58 is used as an inline intercooler for the compressor. As the working fluid 57 is heated as a result of a compression by the compressor 52, the vanes 58 are used to cool the working fluid 57 by virtue of being in thermal contact with the cooling fluid 68 via the heat tube 64. Heat can be conducted away from the working fluid 57 and delivered to the cooling fluid 68 to thus cool the working fluid 57.

One aspect of the present application provides an apparatus comprising a gas turbine engine having a turbomachinery flow path between a first wall and a second wall and a heat exchange flow path external to the first wall, an airfoil member extending between the first wall and the second wall of the turbomachinery flow path, and a heat transferring member in thermal contact with the airfoil member and extending through the first wall and exposed in the heat exchange flow path.

A feature of the present application provides wherein a working fluid is diverted from a location in the gas turbine engine upstream of the airfoil member to form a heat exchange fluid and is flowed through the heat exchange flow path, the heat exchange fluid in the form of a cooling fluid.

Another feature of the present application provides wherein the airfoil member is a compressor vane and the turbomachinery flow path is a flow path through a multistage compressor, the compressor vane forming an intercooler of the gas turbine engine.

Still another feature of the present application further include a plurality of airfoil members, wherein the airfoil member is made from a heat conductive material, and wherein a heat exchange fluid in the heat exchange flow path is prevented from entering the airfoil member.

Yet still another feature of the present application provides wherein the airfoil member and the heat transferring member is a unitary member.

Still yet another feature of the present application provides wherein the heat transferring member operates on the basis of heat conduction to transfer heat between the airfoil member and the heat exchange flow path.

A further feature of the present application provides wherein a heat from the heat transferring member is transmitted away from the airfoil member by one of convection or radiation.

Another aspect of the present application provides an apparatus comprising a gas turbine engine having a rotating component capable of changing a temperature of an airflow traversing a flow path through the rotating component, an air flow partitioning device extending between a first wall and a second wall of the flow path, a heat exchange flow path located on an outside of the first wall and capable of flowing a heat exchange airstream which remains external to the air flow partitioning device, and a thermal member exposed to a heat exchange airstream in the heat exchange flow path and connected to the air flow partitioning device, the thermal member capable of transferring heat between the air flow partitioning device and the heat exchange airstream in the heat exchange flow path.

A feature of the present application further includes a manifold having an inlet and an outlet, the manifold forming the heat exchange flow path in which the thermal member is exposed to the heat exchange airstream, wherein the manifold extends circumferentially around the rotating component to enclose a plurality of thermal members.

Another feature of the present application provides wherein the heat exchange flow path extends axially along the gas turbine engine, wherein a plurality of air flow partitioning devices are located axially aft in the gas turbine engine, and wherein a plurality of thermal members are connected to the plurality of airflow portioning devices located axially aft, the plurality of air flow partitioning devices located in the heat exchange flow path.

Still another feature of the present application provides wherein the rotating component is a compressor of the gas turbine engine and the thermal member and the air flow partitioning device form part of an intercooler of the compressor, and wherein a heat is transmitted from the thermal member using one of convection or radiation.

Yet still another feature of the present application provides wherein the thermal member includes a wall defining a hollow center.

Still yet another feature of the present application provides wherein the thermal member includes a heat flow path through a fin disposed in the heat exchange flow path, and wherein the air flow partitioning device is a vane of a compressor.

A further feature of the present application provides wherein the fin is a crimped end of a thermal member.

Still another aspect of the present application provides an apparatus comprising a gas turbine engine compressor having first and second flow path walls and a row of vanes disposed between the walls, a heat exchange area exterior to the first flow path wall, and means for transferring heat between a plurality of vanes of the row of vanes and a flow of working fluid through the heat exchange area.

A feature of the present application provides wherein the means includes a fin disposed in the heat exchange area exterior to the first flow path wall.

Yet still another aspect of the present application provides a method comprising flowing a working fluid through a rotating component of a gas turbine engine, changing a temperature of the working fluid by rotation of the rotating component, passing a heat exchange fluid through a heat exchange flow path external to a flow path that the working fluid traverses through the rotating component, the working fluid having a different temperature than the heat exchange fluid, transferring heat between an airfoil member disposed in flow communication with the rotating component and the heat exchange fluid passing through the heat exchange flow path external to the rotating component.

A feature of the present application provides wherein the passing includes streaming the heat exchange fluid along a surface of a heat device disposed in the heat exchange flow path.

Another feature of the present application provides wherein the passing includes withdrawing a portion of a working fluid from a flow path of the gas turbine engine, and wherein the transferring heat includes a heat exchange fluid that is relatively cooler than the working fluid.

Still another feature of the present application provides wherein the working fluid is a bypass flow of the gas turbine engine.

Yet still another feature of the present application provides wherein the transferring includes intercooling a compressor of the gas turbine engine.

Still yet another feature of the present application provides wherein the transferring includes transferring heat with a plurality of airfoil members arranged circumferentially around the rotating component of the gas turbine engine.

A further feature of the present application provides wherein the plurality of airfoil members is disposed at a plurality of axial locations.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having a turbomachinery flow path between a first wall and a second wall and a heat exchange flow path external to the first wall;
an airfoil member extending between the first wall and the second wall of the turbomachinery flow path and exposed to a turbomachinery fluid in the flow path; and
a heat transferring member in thermal contact with the airfoil member and extending through the first wall and exposed to a heat exchanger fluid flowing in the heat exchange flow path, wherein the heat transferring member is incapable of having heat transfer fluid internal thereto.

2. The apparatus of claim 1, wherein a working fluid is diverted from a location in the gas turbine engine upstream of the airfoil member to form the heat exchange fluid that is flowed through the heat exchange flow path, the heat exchange fluid in the form of a cooling fluid.

3. The apparatus of claim 2, wherein the airfoil member is a compressor vane and the turbomachinery flow path is a flow path through a multistage compressor, the compressor vane forming an intercooler of the gas turbine engine.

4. The apparatus of claim 1, which further include a plurality of airfoil members, wherein the airfoil member is made from a heat conductive material, and wherein the heat exchange fluid in the heat exchange flow path is prevented from entering the airfoil member.

5. The apparatus of claim 1, wherein the airfoil member and the heat transferring member is a unitary member.

6. The apparatus of claim 1, wherein the heat transferring member operates on the basis of heat conduction to transfer heat between the airfoil member and the heat exchange flow path.

7. The apparatus of claim 1, wherein a heat from the heat transferring member is transmitted away from the airfoil member by one of convection or radiation.

8. The apparatus of claim 1, wherein the heat transfer member includes a fin formed on one end of a heat tube, the fin defined by a flattened portion of the heat tube.

9. An apparatus comprising:
a gas turbine engine having a rotating component capable of changing a temperature of an airflow traversing a flow path through the rotating component;
an air flow partitioning device extending between a first wall and a second wall of the flow path;
a heat exchange flow path located on an outside of the first wall and capable of flowing a heat exchange airstream which remains external to the air flow partitioning device; and
a thermal member having an area extending through the first wall which receives a heat exchange airstream in the heat exchange flow path and the thermal member connected to the air flow partitioning device, the thermal member capable of transferring heat between the air flow partitioning device and the heat exchange airstream in the heat exchange flow path; wherein the thermal member is always free from internal heat transfer fluid.

10. The apparatus of claim 9, which further includes a manifold having an inlet and an outlet, the manifold forming the heat exchange flow path in which the thermal member is exposed to the heat exchange airstream, wherein the manifold extends circumferentially around the rotating component to enclose a plurality of thermal members.

11. The apparatus of claim 9, wherein the heat exchange flow path extends axially along the gas turbine engine, wherein a plurality of air flow partitioning devices are located axially aft of the rotating component in the gas turbine engine, and wherein a plurality of thermal members are connected to the plurality of airflow partitioning devices located axially aft, the plurality of air flow partitioning devices located in the heat exchange flow path.

12. The apparatus of claim 11, wherein the rotating component is a compressor of the gas turbine engine and the thermal member and the air flow partitioning device form part of an intercooler of the compressor, and wherein a heat is transmitted from the thermal member using one of convection or radiation.

13. The apparatus of claim 9, wherein the thermal member includes a wall defining a hollow center.

14. The apparatus of claim 9, wherein the thermal member includes a heat flow path through a fin disposed in the heat exchange flow path, and wherein the air flow partitioning device is a vane of a compressor.

15. The apparatus of claim 14, wherein the fin is a monolithic extension of the thermal member defined by a crimped region thereof.

16. An apparatus comprising:
a gas turbine engine compressor having first and second flow path walls and a row of vanes disposed between the walls;
a heat exchange area exterior to the first flow path wall; and
means for transferring heat between a plurality of vanes of the row of vanes and a flow of working fluid through the heat exchange area, the means for transferring including a heat transfer portion of the plurality of vanes extending through the first flow path wall to contact the working fluid and wherein the means for transferring is permanently devoid of heat transfer fluid internal thereto.

17. The apparatus of claim 16, wherein the means includes a fin disposed in the heat exchange area exterior to the first flow path wall.

18. A method comprising:
flowing a working fluid through a rotating component of a gas turbine engine;
changing a temperature of the working fluid by rotation of the rotating component;

passing a heat exchange fluid through a heat exchange flow path external to a flow path that the working fluid traverses through the rotating component, the working fluid having a different temperature than the heat exchange fluid; and transferring heat through a heat tube connected with an airfoil member disposed in flow communication with the rotating component, the heat tube extending through a wall between the heat exchange flow path and the flow path, the heat tube transferring heat between the airfoil member and the heat exchange fluid passing through the heat exchange flow path external to the rotating component by virtue of a mass flow rate along a surface of the heat tube; and wherein heat is transferred through the heat tube without using internal heat transfer fluid to transfer heat during operation of the gas turbine engine.

19. The method of claim 18, wherein the passing includes withdrawing a portion of the working fluid from the flow path of the gas turbine engine, and wherein the transferring heat includes heat exchange fluid that is relatively cooler than the working fluid.

20. The method of claim 19, wherein the withdrawing includes diverting a portion of the working fluid to a bypass flow of the gas turbine engine.

21. The method of claim 18, wherein the transferring includes intercooling a compressor of the gas turbine engine.

22. The method of claim 18, wherein the transferring includes transferring heat with a plurality of airfoil members arranged circumferentially around the rotating component of the gas turbine engine.

23. The method of claim 22, wherein the plurality of airfoil members is disposed at a plurality of axial locations.

* * * * *